Sept. 19, 1950  W. J. NANKEMAN  2,522,533
ANIMAL CATCHING AND HOLDING IMPLEMENT
Filed Aug. 6, 1948

William J. Nankeman
INVENTOR.

BY *Clarence A. O'Brien*
*and Harvey B. Jacobson*
Attorneys

Patented Sept. 19, 1950

2,522,533

UNITED STATES PATENT OFFICE 2,522,533

ANIMAL CATCHING AND HOLDING IMPLEMENT

William J. Nankeman, Dodson, Mont.

Application August 6, 1948, Serial No. 42,938

4 Claims. (Cl. 119—153)

The present invention relates to restraining devices in the broad class of animal husbandry and has reference in particular to loop-type implements which are used for catching, holding and handling various kinds of animals such as sheep, lambs, goats, calves, pigs and the like.

The cardinal objective is to enable the user to adequately catch, hold and handle capricious and unruly animals with appreciable ease and convenience, to catch loose animals with speed and certainty, and to attain the collective ends in the most humane manner possible.

Many tools and implements in the field of invention under advisement involve constricting snares and nooses and these said devices utilize the theory of inflicting pain and forcible restraint on the animal in order to keep him in hand. In an effort to avoid all possible cruelty along the stated lines, I have evolved and produced an implement characterized by a reach pole or staff and non-restrictive head encircling and neck embracing means which are sufficiently flexible in relation to the staff to enable the user to skillfully utilize the implement in aptly and safely catching an animal and thereafter holding him that he may be led to the desired place of keeping.

In order to achieve wanted ends I equip the handling staff on its outer end with appropriately constructed means to encollar the so-called hook (the head and neck of an animal) in a manner to govern and control same for such purposes as are necessary.

More specifically, in carrying out a preferred embodiment of the invention I employ a ring-like hoop which is pivotally and swingably mounted on the outer end of the staff, and a yoke which is also pivotally mounted and swingable on the staff, the limbs of the yoke being hingedly connected to intermediate side portions of the hoop in order that said hoop may be swung in limited directions to take positions on substantially diametrically opposite sides of the staff and to provide the features of adaptation deemed necessary in providing a safe and satisfactory implement.

Other objects and advantages will become more readily apparent from the following description and the accompanying illustrative drawings.

Figure 5:
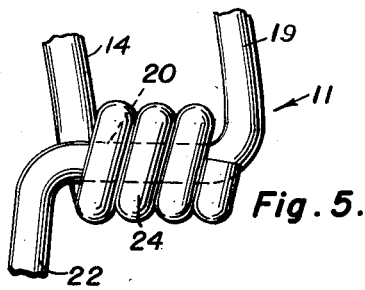

Referring now to the drawings by distinguishing reference numerals and correspondng lead lines, the handling staff or reach pole, as it is sometimes referred to, is denoted by the numeral 7. It is preferably of wood or equivalent stock and is slightly in excess of three feet in length. The material used should be sturdy, to provide the desired strength, and light in weight for manipulative handling. At its outer end the staff is provided with a transverse pivot hole 8 which is eccentric to the longitudinal axis of said staff. Inward of the bale 8 is a transverse bore 9 and this is also eccentric to the longitudinal axis of the staff and is elongated. For convenience of description the bore 8 is designated as a hole and the bore 9 as a slot. There is a thimble or ferrule 10 mounted on the apertured end portion of the staff and this has holes and slots to correspond with the already described hole 8 and the slot means 9.

Figure 1:
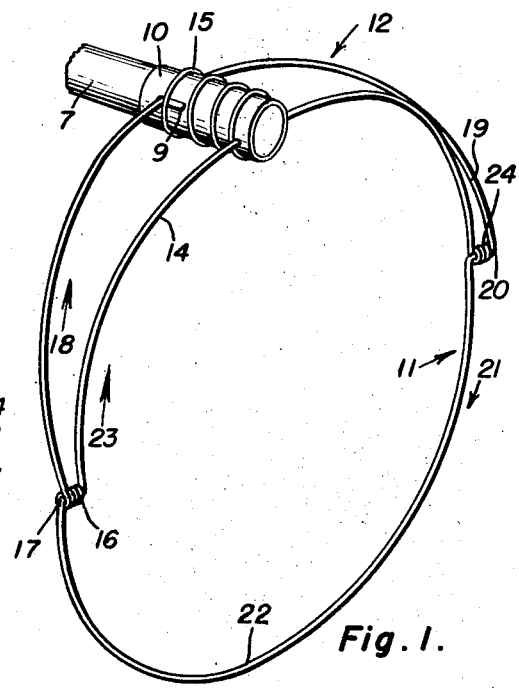
Figure 1 is a perspective view showing the outer end of the reach pole or handling staff and showing the adjustable collaring hoop and associated parts attached to and carried by the staff, the hoop being at an approximate right angle position in relation to the axis of the staff.
Figure 4:
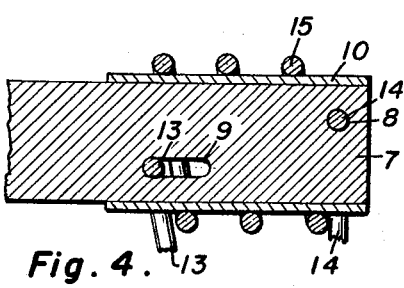
Figure 4 is a central longitudinal sectional view on the plane of the line 4—4 of Figure 2, the shaft being shown in elevation; and, Figure 5 is an enlarged fragmentary detail view showing how one end of the wire bail terminates in a coil, with the latter attached to a portion of the hoop.

The collaring means is essentially made up of two primary units; namely, a ring-like wire hoop 11 of appropriate diameter and a substantially U-shaped yoke or bail 12 also of wire. The free ends of the limp portions of the bail are hingedly connected with diametrically opposite portions of the hoop. The bight portion of the yoke, the part 13 is rockable and bodily slidable in the slot means 9. The inner attachable arcuate portion 14 of the hoop is hingedly mounted in the hole means 8. A coiled spring 15 surrounds the sleeve or ferrule and has its endmost convolutions bearing respectively against the bight portion 13 of the yoke 12 and the corresponding portion 14 of the hoop 11. In the drawings I have shown how both members 11 and 12 may be made from a single length of wire and it will be necessary to trace the wire bending steps to clarify this. Referring to Figure 1 I will start with one terminal or end of the wire which is denoted by the numeral 16. This is coiled around a straight bend 17 which may be designated as a journal and which forms a part of the main hoop 11. Then, the wire is extended in the direction of the arrow 18 where it is bent into U-shape form to define the aforementioned U-shaped yoke whose bight portion, as stated, passes slidably and rockably through the slot means 9. The right hand end portion 19 of the wire is now bent to form another straight portion 20 which is a second journal and which is diametrically opposite to the first named journal 17. Then, the wire is bent and curved, in the direction of the arrow 21, to form the semi-circular outer half portion 22 of the hoop 11. Next, the wire is bent laterally and fashioned into the aforementioned journal 17. Now, the wire is again bent into semi-circular form, as at 23, where it defines the aforementioned inner half portion 14 of the hoop. The intermediate portion of said half-portion 14 passed through and rockable in the hole means 8. The final terminal of the wire which is denoted at 24 is coiled around the aforementioned bend or journal 20.

Figure 2:
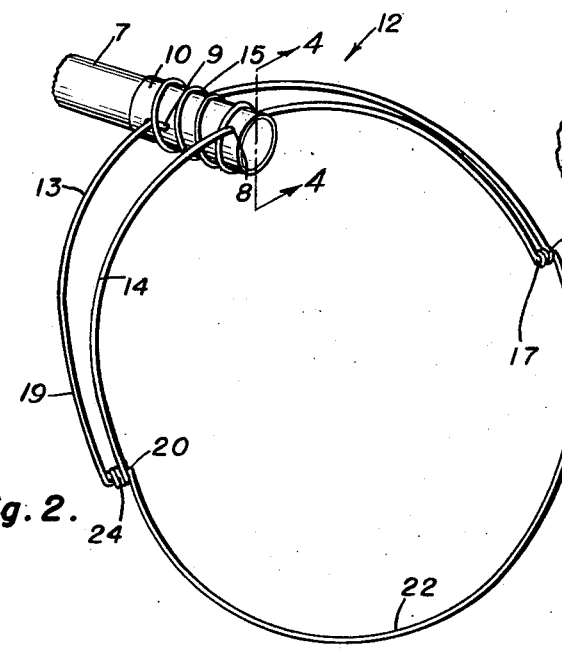
Figure 2 is likewise a perspective view showing the same structural details and also showing the hoop swung to a diametrically opposite side of the shaft and then inverted to take the same position seen in Figure 1 at which time the hoop is at an approximate obtuse angle in relation to the staff.
Figure 3:
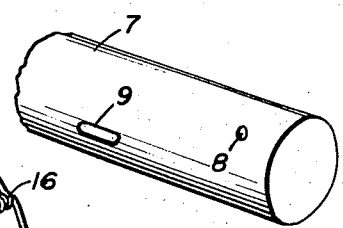
Figure 3 is a fragmentary perspective view on an enlarged scale showing the apertures eccentrically arranged on the outer end of the staff.

By way of further explanation it is to be assumed that the primary angular position of the hoop 11 in relation to the longitudinal axis of the handle or staff 7 is that shown in Figure 1, wherein the hoop is substantially at right angles to the staff. The hoop also has a second position diametrically opposite to that shown in Figure 1 and the second position is the secondary angular position and, in the latter, the hoop is at an approximate obtuse angle in relation to the axis of the staff. This obtuse angular position is shown in Figure 2. In the latter showing the hoop has been swung over from the position shown in Figure 1 to an obtuse angular position and then the entire tool or implement has been turned upside down or reversed so that we are looking at the primary angular position, in Figure 1, and the secondary angular position, in Figure 2. In any event, the hoop is swingable through an arc from one side of the handle to the other and it is constantly under tension by the action of the coiled spring 15. Thus, the hoop stays put in either of these two positions but when put under strain the spring tension is relieved and the hoop can swing from one position to the other and vice versa. So, by skillfully maneuvering the staff and allowing the hoop to take whichever position seems best for handling and holding the animal, it is possible to restrain the animal with definite but nevertheless humane pressure.

It has been ascertained that when the hoop is in the secondary angular position of Figure 2 it is more favorable to catch over the animal's head when the latter is held up in driving and shooing the animal along a course of movement. The primary angular position of Figure 1 shows the parts in relation in which the implement is more favorable to catch the animal when the animal has its head in a downward position. As is generally the case with manually regulable implements and so-called hand tools, actual experimental use will enable the user to best learn the proper "tricks" in employing my novel implement in catching, holding and handling animals.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

Having described the invention, what is claimed as new is:

1. An animal catching, holding and handling implement of the class shown and described comprising an elongated rigid staff, a substantially circular hoop pivotally mounted on one end of said staff, said pivotal mounting being eccentric to the longitudinal axis of said staff, a yoke pivotally connected to said staff at a point intermediate the ends of the yoke and provided with end portions hingedly connected to diametrically opposite portions of said hoop, the hinged connection between the yoke and staff being eccentric to the longitudinal axis of the staff, and a coiled spring surrounding the staff and interposed between the pivoted portions of the hoop and yoke respectively.

2. An animal catching, holding and controlling implement of the class described comprising an elongated rigid staff provided at one end with a transverse hole and provided inwardly of said hole with a slot, said slot being parallel to the hole, a hoop having a portion pivotally connected to said staff by way of said hole, a substantially U-shaped yoke having a portion pivotally connected to said staff by way of said slot, the ends of said yoke being hingedly attached to diametrically opposite portions of said hoop, said hole being on one side of the longitudinal axis of said staff and said slot being on another side of said longitudinal axis whereby said hole and slot are eccentric to said longitudinal axis, and a coiled spring surrounding said staff between pivotally connected portions of the yoke and hoop respectively.

3. An animal holding implement of the class described comprising a rigid staff, a ring-like member pivotally mounted on the outer end of the staff and adapted to embrace the neck of the animal, a U-shaped bail having its central portion slidably and pivotally connected with said staff and its end portions hingedly connected to diametrically opposite portions of said ring-like member, and spring means surrounding said staff and abutting coacting portions of the ring-like member and yoke.

4. A manually manipulable animal catching, holding and behavior controlling implement of the class herein shown and described comprising an elongated rigid staff adapted to serve as a handle and adapted to be grasped and held at one end in the hands of the user, a substantially circular wire hoop adapted to encollar the neck of an animal, a portion of said hoop being hingedly connected to the opposite end of said staff and being adapted to occupy chosen angular positions in respect to the longitudinal axis of the staff, said hoop being provided at points diametrically opposite to each other with journals, a U-shaped bail having an intermediate portion hingedly and slidably connected with said staff at a point spaced longitudinally from the adjacent pivotally connected portion of said hoop, the end portions of said bail being respectively connected with the respective journals.

WILLIAM J. NANKEMAN.

REFERENCES CITED

The following references are of record in the file of this patent:

UNITED STATES PATENTS

| Number | Name | Date |
|---|---|---|
| 534,875 | Gress | Feb. 26, 1895 |
| 687,185 | Allen | Nov. 26, 1901 |
| 795,383 | Aronson | July 25, 1905 |
| 901,210 | Tarrant | Oct. 13, 1908 |
| 1,234,441 | Boyden | July 24, 1917 |